Jan. 9, 1968  R. T. FINLAY  3,362,281
INSERT BUSHING
Filed Feb. 25, 1966
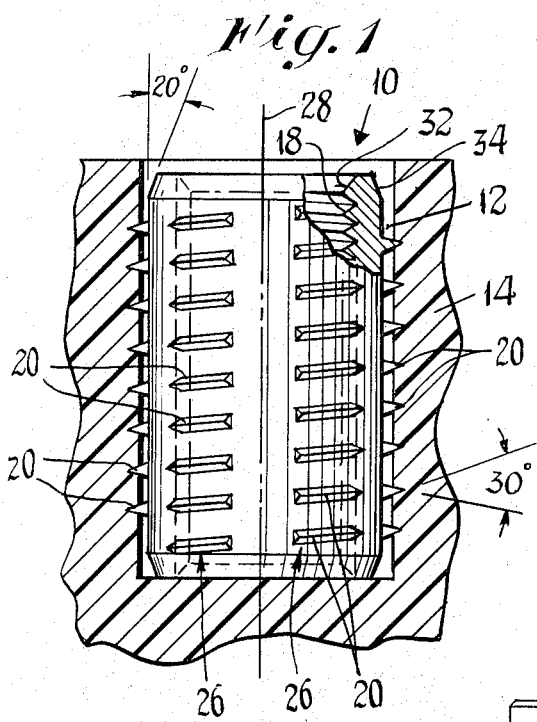
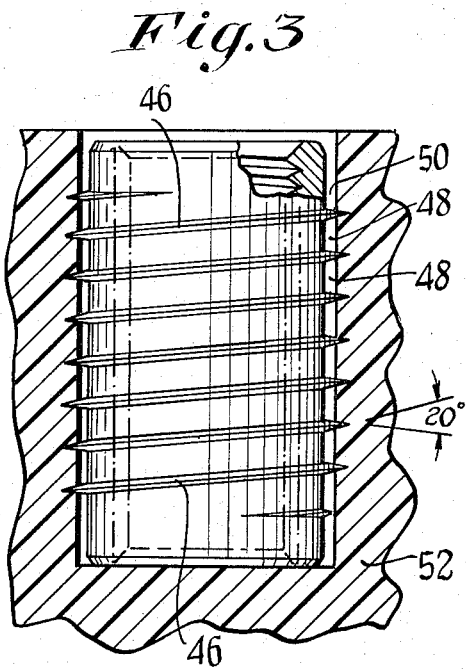
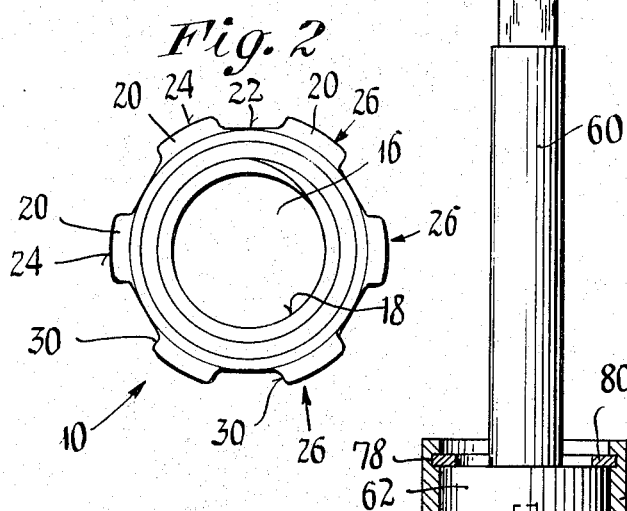
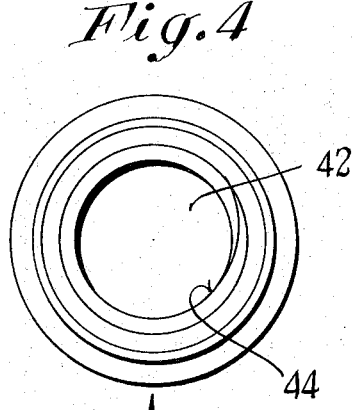
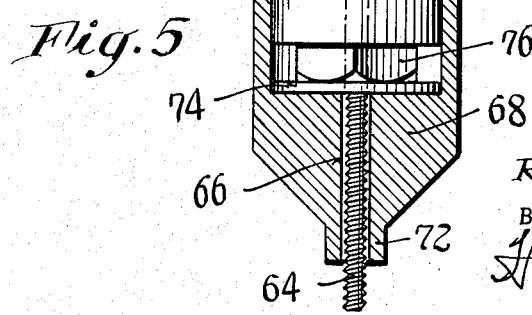
INVENTOR.
Robert T. Finlay
BY
AGENT United States Patent Office 3,362,281
Patented Jan. 9, 1968

3,362,281
INSERT BUSHING
Robert T. Finlay, Westport, Conn. (% Fastener Products, Inc., Box 233, Southport, Conn. 06490)
Filed Feb. 25, 1966, Ser. No. 538,133
3 Claims. (Cl. 85—47)

ABSTRACT OF THE DISCLOSURE

A threaded metal insert bushing for embedment in a preformed hole of a body of softer material, said bushing formed from a short length of extruded metal tubing having a longitudinally fluted exterior with straight, longitudinally extending alternate grooves and raised lands, the lands being machined to form ridges constituting a sharp, interrupted V-thread defining a screw helix. The leading cutting edges of the V-thread ridges comprise high density uncut extrusion skin surfaces having a relatively high resistance to attrition.

This invention relates to metal insert bushings for use in plastic constituted of soft materials such as plastic, wood, soft metal and the like, and further relates to tools for applying said inserts.

Objects of the invention are to provide an improved metal insert bushing for insertion in a preformed hole of a part of softer material, which bushing may be especially easily and quickly inserted in the part and reliably retained therein while at the same time being characterized by simple techniques in its production and desirably low manufacturing cost; to provide a bushing as above, which is adaptable to holes having production dimensional variations, thereby to eliminate the requirement of critical tolerances; to provide a bushing of the kind indicated, which tends to be accurately centered in the hole whereby precise center dimensions are possible; and to provide an improved applicator tool for inserting said bushings, which tool is at one and the same time particularly effective and foolproof in its operation and simple and inexpensive in construction, having but few components of uncomplicated shape, capable of quick and easy assembly.

Other features and advantages will hereinafter appear.

In the drawings:

FIG. 1 is a side elevational view of an improved bushing as provided by the invention, mounted in a plastic part which latter is shown in section.

FIG. 2 is a top or end plan view of the bushing of FIG. 1.

FIG. 3 is a view like FIG. 1, showing another embodiment of the invention.

FIG. 4 is a top or end plan view of the bushing of FIG. 3.

FIG. 5 is an axial sectional view of an applicator tool as provided by the invention, portions being shown in side elevation.

Considering first FIGS. 1 and 2, the insert bushing illustrated therein comprises a tubular metal member designated generally by the numeral 10, which is adapted to be forcibly screwed into a preformed hole 12 (FIG. 1) of a softer body 14. The tubular member 10 has a threaded bore 16 provided with internal screw threads 18 of the type intended to accommodate a usual type of fastening screw.

On its exterior, the tubular member 10 has a novel, helically disposed, sharp screw means 20 which is adapted to make its own thread in the hole 12 of the softer body 14 when the member 10 is forcibly screwed into said hole. The sharp screw means 20 comprises a V-thread formation which in its entirety defines a single hypothetical screw helix.

The metal tubular member 10 is constituted of a short cut-off length of extruded metal tubing of the type having a longitudinally fluted exterior, including alternate longitudinal grooves 22 and longitudinal raised portions or lands 24, the grain of the metal in consequence of its being extruded running with the lands and grooves, or axially of the member. Preferably the grooves 22 have a width, that is, extend circumferentially each through an arc of 30° of the central angle, and the lands 24 have similar widths or similarly extend through a 30° arc each. By such arrangement there is a total of six longitudinal grooves 22 and six corresponding longitudinal lands 24 making up the fluted exterior of the member 10. However, it will be understood that a greater or lesser number of grooves and lands may be utilized, instead of the six shown.

In FIGS. 1 and 2, the sharp screw means comprises a plurality of longitudinally extending rows, designated generally 26, of sharp, cutting helically disposed ridges which constitute the thread elements 20. The rows 26 are equispaced about the circumference of the member 10.

As seen in FIG. 1, the ridges 20 are slanted with respect to the axis 28 of the member, and constitute portions of the said hypothetical helix mentioned above. The grain of the metal is substantially transverse of the ridges 20.

Considering FIG. 2, the leading edges 30 of the ridges 20 have the same characteristics as the extrusion skin, with a high density and relatively high resistance to attrition, both said qualities being of considerable advantage in a thread forming tool such as thread cutting inserts, particularly where the basic stock from which the inserts are cut is die formed. The leading edges 30 terminate substantially abruptly and include knife-sharp portions that constitute cutting points which shear a helical thread groove in the plastic member 14.

Preferably, as seen in FIG. 1, the V-thread formations 20 have a relatively small included angle, indicated as 30°. Also, the base portions of adjoining ridges are spaced apart a distance greater than the thickness of said base portions. Thus, a relatively wide helical groove is defined between the sharp cutting ridges of the member 10. The said helical groove has a "flat" bottom surface, that is, one which is substantially straight in directions transversely of the groove, whereby the bottom surface lies in a hypothetical cylinder which is concentric with the axis of the member 10.

The ends of the member 10 preferably have bevelled edges 32, 34 to facilitate insertion, in either end, of the fastening screw which is engageable with the threads 18 and to facilitate insertion of either end of the member 10 in the hole 12.

I have found that an insert bushing as constructed in accordance with the foregoing is very advantageous in that it may be especially easily and quickly inserted in preformed holes of softer parts, and reliably retained therein while at the same time it is characterized by simple techniques of production and a desirably low manufacturing cost. Due to the fabrication of the bushings from extruded stock, a low cost is readily obtained while at the same time there is had the advantage of the multiple cutting edges represented by the leading ends 30 of the helically disposed ridges. This organization, together with the relatively sharp nature of the ridges involving the small included angle and the wide spacing between adjoining ridges enables the bushing to be adaptable to holes having production dimensional variations, thereby eliminating the requirement of critical tolerances.

Moreover, the bushings tend to be accurately centered in the holes whereby relatively precise center dimensions are possible in the finished product. The bushings, in addition to being very easily insertable by a simple driving tool, are nevertheless reliably retained in the plastic part and are able to counteract a considerable force applied to the fastening screw which is threaded into the bushing at a later time. The multiplicity of rows 26 provides a large number of the cutting ends 30, eliminating malfunction during the assembly of the bushing to the plastic part and minimizing rejects.

Another embodiment of the invention is illustrated in FIGS. 3 and 4, wherein a metal bushing 40 having a bore 42 and internal threads 44, has on its exterior a helically disposed sharp screw means 46 in the form of a continuous thread of relatively small included angle, an angle of 20° being indicated in FIG. 3. A relatively wide spacing exists between adjoining thread elements, such spacing comprising a relatively wide helical groove 48 outlining a common cylindrical surface.

By virtue of the wide spacing between the thread elements or adjoining thread portions 46 and the sharp nature of such thread portions, involving a 20° included angle, the bushing will readily form a thread in the preformed hole 50 of the plastic body 52. The outside diameter of the helical thread 46 is made slightly larger than the diameter of the preformed hole 50 whereby the thread 46 becomes embedded in the plastic body 52. However, a space exists between the wall of the hole 50 and the bottom of the helical groove 48, indicating that the thread 46 does not become completely embedded in the plastic body. The amount of embedment is just sufficient to reliably retain the bushing against dislodgment from the hole 50 while at the same time enabling the bushing to be easily forcibly screwed into the hole.

In accordance with the invention there is provided a novel and improved tool, illustrated in FIG. 5, for inserting the bushings of FIGS. 1-4 in preformed holes of softer bodies. The said tool comprises a shank 60 having at one end a bearing enlargement 62. Affixed to and projecting from the bearing enlargement 62 is a driving screw 64 which extends through a central axial bore 66 of an inertia member 68.

The inertia member 68 comprises a metal body having a substantial mass and having a hollow bearing portion 70 which surrounds and rotatably bears on the bearing enlargement 62 of the shank. The inertia member 68 surrounds all but a small end portion of the driving screw 64 as shown, and further includes an abutment collar portion 72 of reduced diameter, disposed adjacent the end portion of the screw 64. The said end portion of the screw 64 is arranged to be threaded into the bore of the bushings illustrated in FIGS. 1-4, with the abutment collar portion abutting the end of the bushings whereby there is effected a driving connection to the bushing.

The tool of FIG. 5 carrying the insert bushing, in being properly rotated and applied to the plastic body, thus can forcibly thread the bushing into the preformed hole of the body. In the inertia member 68 and carried by the screw 64 is an anti-friction thrust bearing means comprising a flat washer 74 which is preferably formed of Teflon plastic, characterized by a slippery surface. A nut 76 secures the screw 64 fixedly to the bearing enlargement 63, said screw being threaded into said enlargement.

For the purpose of retaining the inertia member 68 captive on the shank head 62 while permitting free rotation of the member about said head at all times, the inertia member is provided with an internal annular groove 78, which accommodates a split retainer ring 80 adapted to engage the uppermost peripheral surface of the bearing enlargement.

In the operation of the tool shown in FIG. 5, a threaded bushing such as that illustrated in FIG. 1 or FIG. 3 is threaded onto the driving screw 64 so as to engage the abutment collar portion 72 of the inertia member 68. By such arrangement, a driving connection is effected between the bushing carried on the screw 64 and the tool shank 60. With the tool mounted on a suitable driving (turning) arbor, the bushing carried thereby is applied to the preformed hole of a plastic body. Advancing rotation of the tool will now cause the insert bushing carried by the screw 64 to be forcibly threaded into the preformed hole. Just before the bushing has become bottomed in the hole, the driving turning force which drives the tool is reversed, causing a reverse rotation of the shank 60. Due to the mass which the inertia member 68 represents, the reversal of turning force which is applied to the shank 60 will at first only cause a reverse turning movement of the screw 64 without effecting a simultaneous reverse turning of the inertia member 68. In consequence, the insert bushing will be prevented from having retrograde turning movement due to the initial frictional engagement with the inertia member 68, and the driving screw 64 will now be withdrawn from the bushing. The presence of the anti-friction washer 74 reduces the friction between the bearing enlargement 62 and the inertia member 68, especially as regards the thrust forces between these parts, whereby the reverse turning of the shank 60 and bearing enlargement 62 will have a reduced tendency to reversibly turn the inertia member 68. Thus, the delay in reverse turning of the inertia member 68 will reliably insure the retention of the threaded bushing insert in the plastic body. Once a relative turning on reverse turning of the screw 64 is established in the insert bushing, then the removal of the applying tool proceeds without danger of removing the bushing which has been inserted thereby.

The diameters of the bearing enlargement 62 and the inertia member 68 are commensurate with each other and relatively large, better than double the diameter of the shank 60; the axial length of the bearing portion 70 of the inertia member is approximately one-half the overall axial length of the inertia member. Thus, the inertia member 68 is constituted to have an appreciable mass, which has the beneficial effect of opposing movement, especially a reverse movement.

The applying tool as illustrated in FIG. 5 is characterized by a free turning relation between the inertia member 68 and the shank 60, and by the inertia member 68 having an appreciable mass whereby it tends to resist an opposing rotation after it has driven the insert bushing into the plastic body. Such arrangement results in an extremely simple configuration of the related parts of the applying tool, making for a low manufacturing cost while at the same time the tool is especially efficient and effective in carrying out the operation described above in detail.

It will now be understood from the foregoing that I have provided novel and improved threaded insert bushings and an applicator tool for applying the same to preformed holes of plastic bodies, which bushings and tools are extremely simple, effective and reliable in operation, and represent an extremely low manufacturing cost without sacrificing effectiveness and reliability.

Variations and modifications may be made within the scope of the claims, and portions of the improvement may be used without others.

I claim:

1. An insert bushing for embedment in a preformed hole of a body of softer material, comprising a tubular metal member having a threaded bore and having on its exterior a helically disposed sharp screw means adapted to make its own thread in the hole of the plastic body when the member is forcibly screwed into said hole, said sharp screw means comprising a V-thread formation defining a single screw helix, said metal member being constituted of a short length of extruded metal stock of the type having a longitudinally fluted exterior with alternate grooves and lands, said sharp screw means comprising a plurality of straight longitudinally extending rows of sharp, cutting, helically extending and disposed ridges, said rows being equi-spaced about the circumference of the member, said ridges being characterized along their crests and ends by a contour which, together with the cross-sectional contour of said grooves, is determined by the cross-sectional configuration of the extrusion, the grain of the metal being substantially transverse to the ridges and said ridges being slanted a slight extent with respect to the axis of the member and constituting portions of a hypothetical helix containing said V-thread formation whereby the member can be forcibly threaded into said hole and can cut its own thread therein, the leading ends of said ridges as well as said grooves being constituted of high density uncut extrusion skin surfaces having a relatively high resistance to attrition, said leading edges terminating substantially abruptly and including knife-sharp cutting points which shear a helical thread groove in said plastic member.

2. A bushing as in claim 1, characterized by adjoining base portions of said ridges being spaced apart a distance greater than the thickness of said base portions; said member at locations between the base portions of the thread having a surface which lies in a hypothetical cylinder which is concentric with the axis of the member.

3. A bushing as in claim 1, characterized by adjoining base portions of said V-thread ridges being spaced apart a distance greater than the thickness of said base portions; said member at locations between the base portions of the ridges having a surface which lies in a hypothetical cylinder which is concentric with the axis of the member; said alternate grooves and lands being of commensurate widths measured circumferentially of the stock whereby the lengths of the individual ridges are commensurate with the spacing between the ridges measured circumferentially.

References Cited

UNITED STATES PATENTS

| 3,280,666 | 10/1966 | Neuschotz | 81—53 |
| 3,280,872 | 10/1966 | Neuschotz | 151—41.73 |
| 3,290,968 | 12/1966 | Parnock et al. | 81—53 |

FOREIGN PATENTS 667,051  2/1952  Great Britain.

JAMES L. JONES, Jr., *Primary Examiner.*